United States Patent
Fazeldehkordi

(10) Patent No.: US 10,832,660 B2
(45) Date of Patent: Nov. 10, 2020

(54) METHOD AND DEVICE FOR PROCESSING WHISPERED SPEECH

(71) Applicant: Futurewei Technologies, Inc., Plano, TX (US)

(72) Inventor: Amin Fazeldehkordi, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 280 days.

(21) Appl. No.: 15/949,358

(22) Filed: Apr. 10, 2018

(65) Prior Publication Data
US 2019/0311711 A1    Oct. 10, 2019

(51) Int. Cl.
| G10L 15/16 | (2006.01) |
| G10L 15/02 | (2006.01) |
| G10L 15/22 | (2006.01) |
| G10L 15/06 | (2013.01) |

(52) U.S. Cl.
CPC .............. *G10L 15/16* (2013.01); *G10L 15/02* (2013.01); *G10L 15/063* (2013.01); *G10L 15/22* (2013.01)

(58) Field of Classification Search
CPC ....... G10L 15/16; G10L 15/02; G10L 15/063; G10L 15/22
See application file for complete search history.

(56) References Cited

U.S. PATENT DOCUMENTS

| 6,353,671 | B1 * | 3/2002 | Kandel | ................ | H04R 25/453 |
| | | | | | 381/312 |
| 9,378,735 | B1 * | 6/2016 | Garimella | ............... | G10L 15/16 |
| 9,466,292 | B1 * | 10/2016 | Lei | ........................... | G10L 15/16 |
| 10,147,439 | B1 * | 12/2018 | Kristjansson | ......... | G10L 21/034 |
| 10,388,272 | B1 * | 8/2019 | Thomson | ................ | G10L 15/22 |
| 10,573,312 | B1 * | 2/2020 | Thomson | ................ | G10L 15/30 |
| 2008/0147391 | A1 * | 6/2008 | Jeong | ....................... | G10L 15/02 |
| | | | | | 704/232 |
| 2015/0269933 | A1 | 9/2015 | Yu et al. | | |

(Continued)

FOREIGN PATENT DOCUMENTS

| CN | 107452389 A | 12/2017 |
| WO | 2017076211 A1 | 5/2017 |

OTHER PUBLICATIONS

Liu Wen-Ju et al., "Deep Learning Based Speech Separation Technology and Its Developments," Acta Automatica Sinica, vol. 42, Issue 6, 2016, 17 pages (partial English translation).

(Continued)

*Primary Examiner* — Mohammad K Islam
(74) *Attorney, Agent, or Firm* — Fish & Richardson P.C.

(57) ABSTRACT

The present disclosure provides embodiments of method, system and devices to convert whispered speech to normal speech intelligently through deep learning, therefore whispered speech can be more robust to interference and more intelligible to listener. A first audio signal is received including first whispered speech; a first plurality of computations are performed on the first audio signal to extract a first features; the first features are provided as input to a trained deep neural network (DNN) model to obtain output of the DNN model comprising a second features; and an inverse of the first plurality of computations are performed on the second features to produce a second audio signal corresponding to a non-whispered version of the first whispered speech.

20 Claims, 5 Drawing Sheets

(56) References Cited

U.S. PATENT DOCUMENTS

| | | | | |
|---|---|---|---|---|
| 2016/0260428 | A1* | 9/2016 | Matsuda | G10L 15/16 |
| 2017/0358301 | A1* | 12/2017 | Raitio | G10L 13/033 |
| 2018/0137880 | A1* | 5/2018 | Wenndt | G06F 21/32 |
| 2018/0233163 | A1* | 8/2018 | Eagleman | G06F 3/016 |

OTHER PUBLICATIONS

PCT International Search Report and Written Opinion issued in International Application No. PCT/CN2019/079776 dated May 29, 2019, 9 pages.

Chi Zhang et al.,"Analysis and Classification of Speech Mode: Whispered through Shouted",University of Texas, dated 2007,total 4 pages.

Xing Fan et al.,"Acoustic Analysis of Whispered Speech for Phoneme and Speaker Dependency",CRSS,dated 2011, total 4 pages.

Taisuke Itoh et al.,"Acoustic Analysis and Recognition of Whispered Speech",IEEE,dated 2012,total 4 pages.

Qin Jin et al.,"Whispering Speaker Identification",IEEE,dated 2007,total 4 pages.

Xing Fan et al.,"Acoustic Analysis for Speaker Identification of Whispered Speech",IEEE,dated 2010,total 4 pages.

H. R. Sharifzadeha et al.,"A Comprehensive Vowel Space for Whispered Speech",Journal of Voice,dated Dec. 1, 2010,total 18 pages.

LifeVibes VoiceExperience 4.0 Production Introduction,NXP Software,dated Jun. 2013,total 17 pages.

* cited by examiner

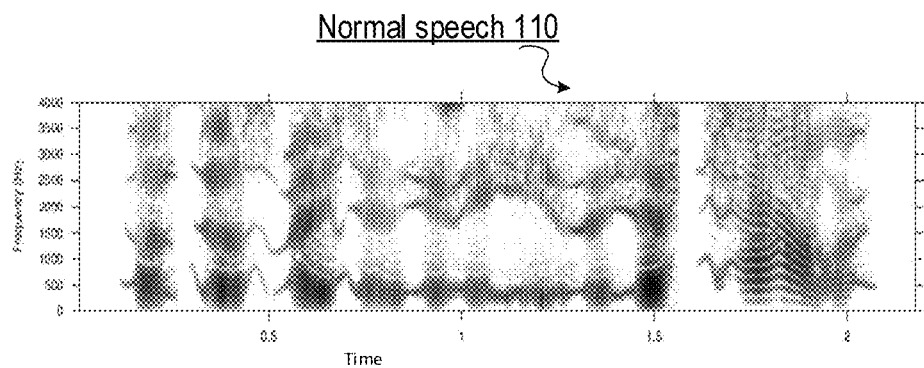
FIG.1A
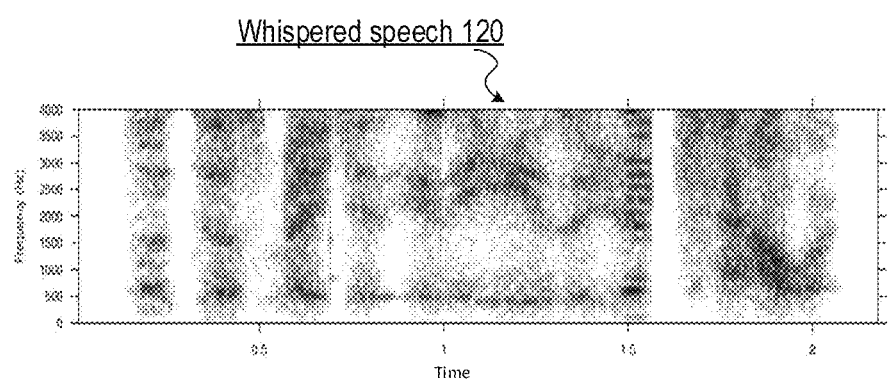
FIG.1B
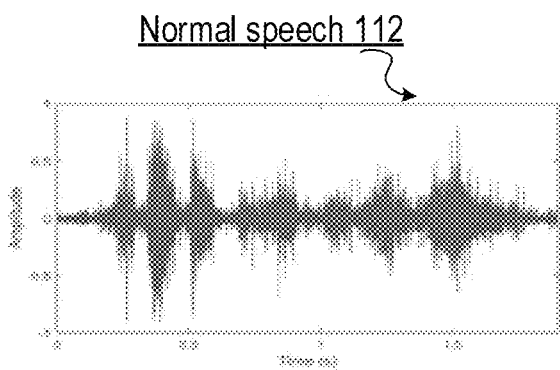 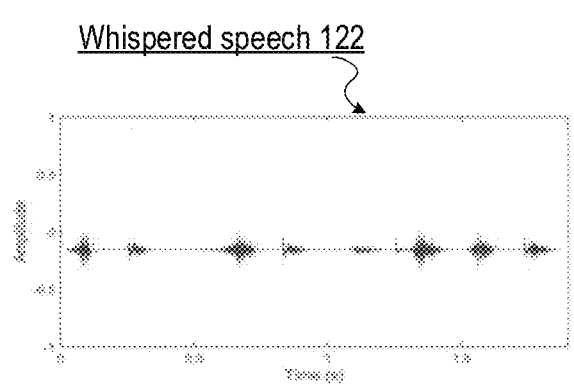
FIG.1C          FIG.1D

METHOD AND DEVICE FOR PROCESSING WHISPERED SPEECH

TECHNICAL FIELD

The present disclosure generally relates to audio processing, in particular audio processing for enhancing whispered speech.

BACKGROUND

Based on modes of speech production or utterance, speech audio signals can be generally classified into normal speech, whispered speech, and shouted speech, etc. Normally phonated speech can be deemed neutral speech or normal speech. Shouted speech may be referred to as the loudest vocal mode of speech, which may require most dramatic change in vocal excitation. Whispered speech may be defined as the quietest vocal mode of speech with limited vocal cord vibration. Whispered speech audio signals usually have much lower energy than that of the normal speech, so they is usually more susceptible to interference. Whispered speech may be created without or with very weak vibration of a person's vocal cords that renderings it difficult to understand by a listener.

SUMMARY

An example embodiment includes a method of processing whispered speech including receiving a first audio signal comprising first whispered speech; performing a first plurality of computations on the first signal to extract a plurality of first features; providing the first features as input to a trained deep neural network (DNN) model to obtain output of the DNN model comprising a plurality of second features; and performing an inverse of the first plurality of computations on the second features to produce a second audio signal corresponding to a non-whispered version of the first whispered speech.

Optionally, in the preceding embodiment, the method includes wherein the first and second features respectively comprises a plurality of frequencies.

Optionally, in any of the preceding embodiments, the method includes wherein performing the first plurality of computations on the first audio signal to extract the first features comprises: dividing the first audio signal into a plurality of partially overlapping data windows; and performing the first plurality of computations on the data windows.

Optionally, in any of the preceding embodiments, the method includes wherein adjacent windows overlap by approximately 50%.

Optionally, in any of the preceding embodiments, the method includes wherein performing the first plurality of computations on the first audio signal to extract the first features further comprises: performing a Fast Fourier Transform (FFT) of the data windows to produce a discrete Fourier Transform (DFT); and calculating the log 10 of a magnitude of the DFT to produce the first features.

Optionally, in any of the preceding embodiments, the method includes wherein the DNN model is a feed-forward model and wherein the model comprises an input layer, an output layer and a plurality of hidden layers between the input and output layers.

Optionally, in any of the preceding embodiments, the method includes wherein the first features are provided to the input layer, wherein the method comprises applying forward propagation to the DNN model to obtain the second features from the output layer.

Optionally, in any of the preceding embodiments, the method further includes: obtaining a plurality of different training pairs, wherein each training pair comprises first features of a respective audio signal comprising whispered speech and second features of a respective audio signal comprising a non-whispered version of the whispered speech; and for each of the training pairs: supplying the first features of the pair as input to the DNN model and comparing the output of the DNN to the second features of the pair using a loss function that produces an output; and applying back-propagation to the DNN model based on the output of the loss function to train the DNN model.

Optionally, in any of the preceding embodiments, the method includes wherein the loss function is:

$$\sum_{n=1}^{N} \left\| \hat{Y}_n(W, b) - Y_n \right\|_2^2,$$

wherein N indicates total number of the plurality of neurons in the DNN model, n indicates count of the calculation of the loss function, W indicates combination of the plurality of weights, b indicates the plurality of biases which are constant number, Y is the second features of the training pair, $\hat{Y}$ is the first features of the training pair.

Another embodiment includes a device of processing whispered speech including: a memory storing instructions; and a processor coupled to the memory, wherein when the processor executes the instructions, the processor performs operations: receiving a first audio signal comprising first whispered speech; performing a first plurality of computations on the first signal to extract a plurality of first features; providing the first features as input to a trained deep neural network (DNN) model to obtain output of the DNN model comprising a plurality of second features; and performing an inverse of the first plurality of computations on the second features to produce a second audio signal corresponding to a non-whispered version of the first whispered speech.

Optionally, in the preceding embodiment, the device includes wherein the first and second features respectively comprises a plurality of frequencies.

Optionally, in any of the preceding embodiments, the device includes wherein performing the first plurality of computations on the first audio signal to extract the first features comprises: dividing the first audio signal into a plurality of partially overlapping data windows; and performing the first plurality of computations on the data windows.

Optionally, in any of the preceding embodiments, the device includes wherein adjacent windows overlap by approximately 50%.

Optionally, in any of the preceding embodiments, the device includes wherein performing the first plurality of computations on the first audio signal to extract the first features further comprises: performing a Fast Fourier Transform (FFT) of the data windows to produce a discrete Fourier Transform (DFT); and calculating the log 10 of a magnitude of the DFT to produce the first features.

Optionally, in any of the preceding embodiments, the device includes wherein the DNN model is a feed-forward model and wherein the model comprises an input layer, an output layer and a plurality of hidden layers between the input and output layers.

Optionally, in any of the preceding embodiments, the device includes wherein the first features are provided to the input layer, wherein the method comprises applying forward propagation to the DNN model to obtain the second features from the output layer.

Optionally, in any of the preceding embodiments, the processor performs operations further including: obtaining a plurality of different training pairs, wherein each training pair comprises first features of a respective audio signal comprising whispered speech and second features of a respective audio signal comprising a non-whispered version of the whispered speech; and for each of the training pairs: supplying the first features of the pair as input to the DNN model and comparing the output of the DNN to the second features of the pair using a loss function that produces an output; and applying back-propagation to the DNN model based on the output of the loss function to train the DNN model.

Optionally, in any of the preceding embodiments, the device includes wherein the loss function is:

$$\sum_{n=1}^{N} \|\hat{Y}_n(W, b) - Y_n\|_2^2,$$

wherein N indicates total number of the plurality of neurons in the DNN model, n indicates count of the calculation of the loss function, W indicates combination of the plurality of weights, b indicates the plurality of biases which are constant number, Y is the second features of the training pair, $\hat{Y}$ is the first features of the training pair.

The present disclosure provides embodiments of method, system and devices to convert whispered speech to normal speech intelligently through deep learning, therefore whispered speech can be more robust to interference and more intelligible to listener.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 1A-1D illustrates examples of normal speech and whispered speech.

DETAILED DESCRIPTION

Figure 2:
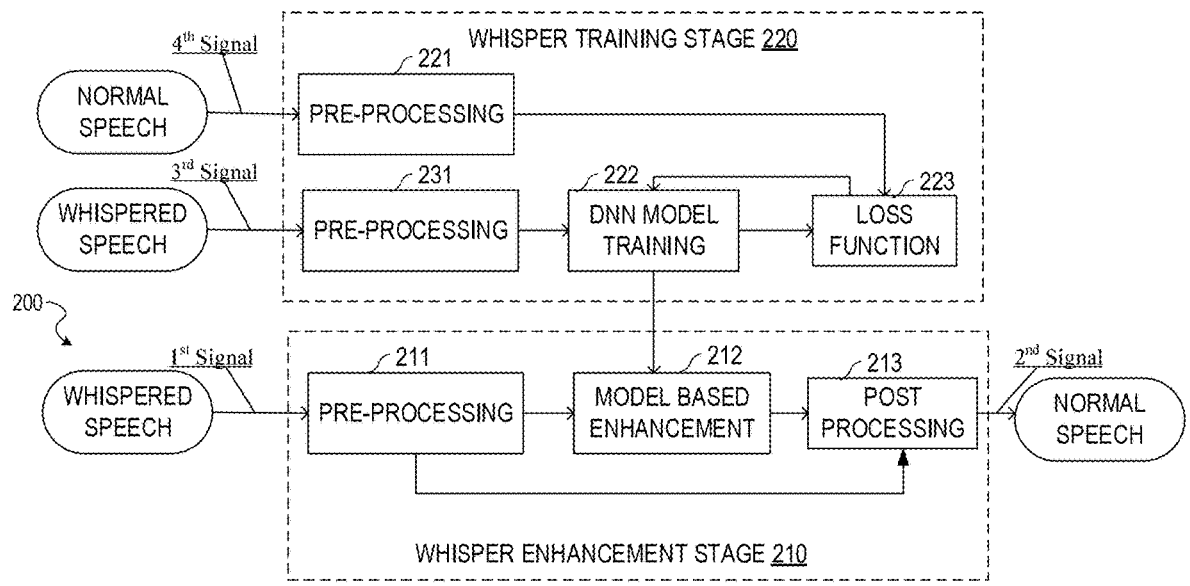
FIG. 2 illustrates a block diagram of a system for processing whispered speech according to an embodiment of the present disclosure.

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The traditional way to enhance whispered speech so that it is easier to hear is based on signal processing like Automatic Gain Control (AGC). Such AGC solutions treat all content of whispered speech the same that they boost signal as well as the noise. The present disclosure provides embodiments of method, system and devices to convert whispered speech to normal speech intelligently through deep learning, therefore whispered speech can be more robust to interference and more intelligible to listener.

Whispered speech differs from other speech in several ways. Unlike normal speech, whispered speech typically has no periodic excitation or harmonic structure, but has formant frequencies that are shifted higher, has a spectral slope that may be flatter, has a longer duration, and exhibits a substantially lower energy level. In addition, whispered speech typically has lower sound pressure level (SPL) as compared to other speech types which results in whispered speech having a lower signal-to-noise ratio (SNR) and lower SPL than normal speech.

Table 1 shows example SNRs from different audio input of voices and environments. Audio inputs were gathered from a microphone ("close-talking mic") with someone speaking at close range to it using normal speech and from a throat microphone ("throat mic") with someone using whispered speech. Each input of speech was recorded in a quite ("clean") environment and in a noisy environment, respectively. From Table 1, a large difference can be seen in the number of decibels (dB) between normal speech and whispered speech.

TABLE 1

| SNR for different mic and environment | | | | |
|---|---|---|---|---|
| | Close-talking Mic | | Throat Mic | |
| | Clean | Noisy | Clean | Noisy |
| Normal | 29.0 | 11.5 | 36.2 | 37.7 |
| Whispered | 9.3 | 2.5 | 4.6 | 12.2 |

Normally humans can hear sounds between 0 and 140 dB. Normal speech has a range of 50 to 60 decibels. The general lower limit for speech is around 30 decibels. Some people may be able to whisper even quieter than 30 decibels, but listeners may have trouble understanding speech below 30 decibels without any assistance. Whispered speech refers typically to a degree of loudness range that is, for example, 30 dB or lower.

FIGS. 1A-1D illustrate examples of normal speech and whispered speech. FIG. 1A illustrates a spectrogram (frequency v. time) of the waveform for a normal speech 110. FIG. 1B illustrates a spectrogram (frequency v. time) of the waveform for a whispered speech 120. FIG. 1C illustrates a frequency spectra (amplitude v. time) of the normal speech 112. FIG. 1D illustrates a frequency spectra of the whispered speech 122 (amplitude v. time). As shown from FIGS. 1A-1D, whispered speech 120, 122 exhibits a greater change duration and a larger variance in speech duration. In addition, the spectral tilt of the whispered speech 122 is less sloped than that of the normal speech 112.

FIG. 2 illustrates a block diagram of a system 200 for converting whispered speech to normal speech according to an embodiment of the present disclosure. The system 200 can be implemented in software, hardware, or a combination of these. A first audio signal is received including whispered speech; a plurality of computations are performed on a first signal to extract whispered speech features (pre-processing 211); the features are provided as input to a trained deep neural network (DNN) model (model 212) to obtain output of the DNN model comprising non-whispered speech features; and an inverse of the first plurality of computations are performed on the non-whispered speech features (post processing 213) to produce a audio signal corresponding to a non-whispered version of the whispered speech.

In FIG. 2, two stages 210, 220 are illustrated: one stage is "whisper enhancement" stage 210 that uses a trained model generated by the whisper training stage 220 to convert whispered speech to non-whispered speech. The "whisper training" stage 220 is used to train a whisper model 212 used by stage 210. Each of whisper enhancement stage 210 and whisper training stage 220 may include a plurality of processing sub-stages. For example, the whisper enhancement stage 210 may include a pre-processing stage 211 to extract a set of features from received speech signals, a model based enhancement stage 212 to obtain output of a DNN model comprising normal speech features, a post-processing stage 213 to generate a non-whispered version of the whispered speech of the first audio signal. Whisper training stage 220 may include pre-processing stages 221, 231 to extract sets of features from normal speech and corresponding whispered speech, respectively; a DNN model training stage 222 to train the DNN model 212 for the model based enhancement stage 212, and a loss function 223 to drive the model training.

Whisper training stage 220 can be executed offline to train whisper models (e.g., model 212). Whisper enhancement stage 210 normally is run in an online mode (e.g., to process speech in real-time as the user is speaking) and uses the trained model from the whisper training stage 220 to convert the user's whisper speech into normal speech. In both stages 210, 220, pre-processing stages 211, 231, and 221 are configured to extract a same set of features from received speech signals. In other implementations, the pre-processing stages 211, 231 and 221 extract different features from each other. The feature extraction performed by 211, 231 and 220 comprises, in some implementations, dividing the audio signal into a plurality of partially overlapping data windows and performing computations on the data windows. In some implementations, adjacent data windows overlap by approximately 50%. Other overlap percentages are possible. The computations may include a process of performing a Fast Fourier Transform (FFT) of the data windows to produce a discrete Fourier Transform (DFT) of the audio signal and calculating the $\log_{10}$ of a magnitude of the DFT to generate the features.

At the model based enhancement stage 212, the whispered features that have been extracted in the pre-processing stage 211 are provided as input to a DNN model to derive a version of non-whispered speech features. The DNN model may be obtained from the DNN model training stage 222 from the whisper training stage 220. At the post-processing stage 213, an inverse of the pre-processing operations 211 are performed on the non-whispered speech features, resulting in an audio signal corresponding to a non-whispered version of the whispered speech.

At the whisper training stage 220, the DNN model is trained and generated for converting whispered speech to non-whispered speech. The DNN model can be a feed-forward model and it may include an input layer, an output layer and a plurality of hidden layers between the input and output layers. The training input comprises a normal speech signal (e.g., a phrase or a word) and a corresponding whispered speech signal of the speech, but in a whispered voice. Both normal speech and whispered speech signals are pre-processed by respective pre-processors, 221 and 231 to generate respective features. The normal speech features are provided as input to the loss function 223 and the whispered speech signals are provided as input to the DNN model training 222.

The loss function 222 is computed by applying a plurality of weights. In some implementations, the loss function is:

$$\sum_{n=1}^{N} \left\| \hat{Y}_n(W, b) - Y_n \right\|_2^2$$

wherein:

N indicates total number of the plurality of neurons in the model, n indicates count of the calculation of the loss function, W is a vector of weights for all of the neurons.

b is a vector of biases for all of the neurons.

Y indicates the set of features from the normal speech generated by 221.

$\hat{Y}$ indicates the set of features whispered speech features generated by 230.

An output of a trained DNN model may be obtained from the DNN model training stage 222 in the whisper training stage 220 and provided to the model based enhancement 212. The trained DNN model has been computed through comparing related models of the normal speech signal and the whispered speech signal. The normal speech signal can be a sample of a non-whispered speech version from the whispered speech signal.

Figure 3:
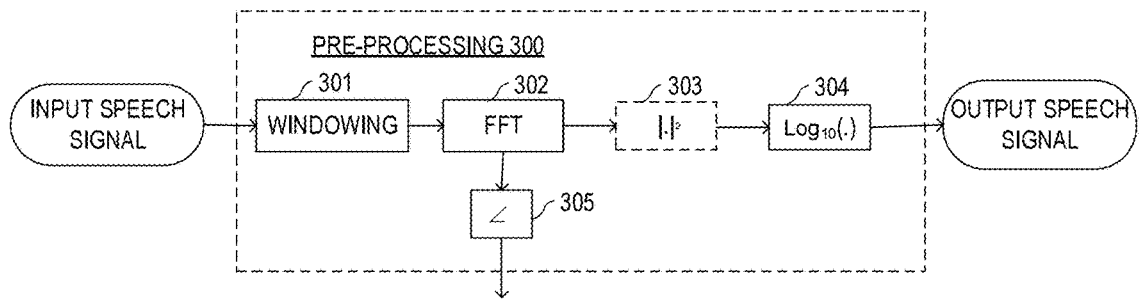
FIG. 3 depicts a pre-processing stage of FIG. 2 for processing whispered speech according to an embodiment of the present disclosure.

FIG. 3 depicts a pre-processing stage (e.g., 221, 231, 211) as of FIG. 2 for generating features according to an embodiment of the present disclosure.

The features being extracted can be reversed, using inverse operations to reconstruct the input speech signal. The features contain perceptually relevant parameters to extract important information from whispered speech for training of DNN models. The features may be different from those that are usually extracted for automatic speech recognition systems (ASRs). An ASR system typically does not need convert features back into an audio signal since the end result are text.

Through pre-processing stages 211, 221, 231, 300, received speech signal is processed with a compact representation and still includes all necessary information for recognition of the received speech.

Pre-processing stages 211, 221, 231, 300 may include a windowing stage 301, and a feature extraction stage of computations 302-305. At the end of the pre-processing stage, the extracted features may be either forwarded to model training tage 222 or model enhancement stage 212.

At pre-processing stages 211, 221, 231, 300, received audio signal which is a function of frequency over time may be split into a series of windows which each comprise a portion of time. The length of the frame or window may vary depending on scope of application and algorithms that are used. The signal in each window can be examined to obtain acoustic characteristics. For example, the signal is segmented into windows of length 20 ms with optional overlap of approximately 50% of the window size. Each window can be analyzed independently and may be represented by a single feature vector.

A plurality of computations on the data windows are performed, for example, Fast Fourier Transform (FFT) 302 is applied to each window to obtain a power spectra of time-series; frequency is spaced for the power spectra whose coefficients are weighted; optionally an absolute value 303 is calculated; and applying logarithms 304 computation on the weights. Optionally the applying of the computation may be done for each of the weights. After computation of FFT, two values might be obtained, one is a value of the magnitude and the other one is a value of the phase. Optionally, an absolute value 303 is calculated on the value of the phase.

In the log-domain feature space a consistency is shown by a loss function with human auditory system. For a given input speech signal, feature vectors are contributed as input to the next stage. Optionally the vectors maybe combined into a single vector e.g. by concatenating the vectors into a single vector. In some implementations, the features that are fed into the loss function are weighted in order better approximate the human auditory system.

Output results of the computations may include magnitude and phase 305 information of the received signal.

Figure 4:
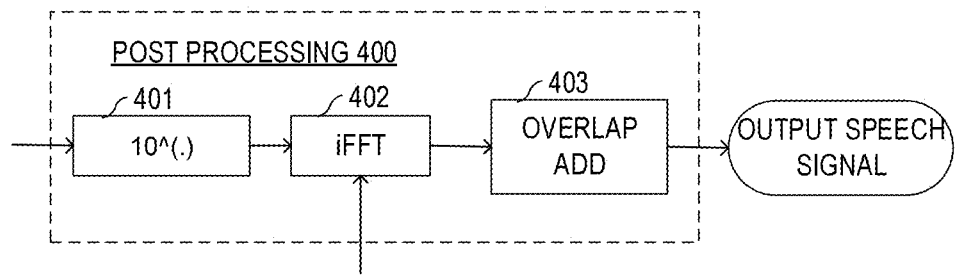
FIG. 4 depicts a post-processing stage of FIG. 2 for processing whispered speech according to an embodiment of the present disclosure.

FIG. 4 depicts a post-processing stage as of FIG. 2 for processing whispered speech according to an embodiment of the present disclosure.

In post-processing stage 400, inverse of operations that have been used in the pre-processing stages 211, 221, 231, 300 as shown in FIG. 2 and FIG. 3, are applied to reconstruct a non-whispered version of the first whispered speech. Enhanced features are obtained and output by the plurality of computations in the model enhancement stage 212 to post-processing 400. The phase of the first whisper speech is being used in the process of reconstructing the non-whispered version speech. The phase may also be used for DNN model training.

Figure 5:
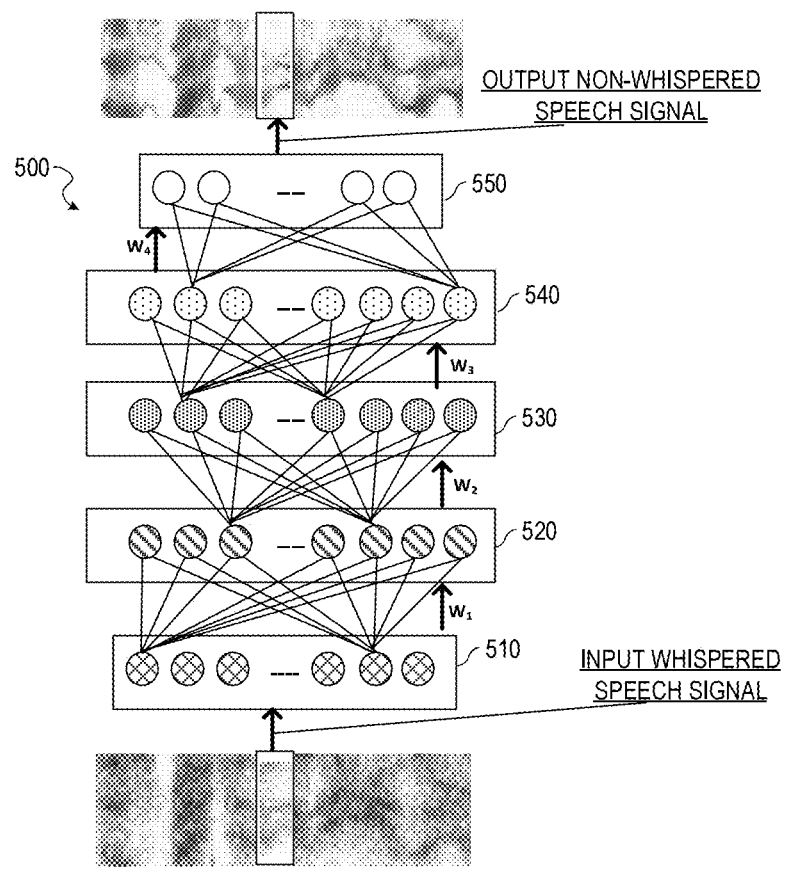
FIG. 5 depicts a block diagram for a DNN architecture according to an embodiment of the present disclosure.

In an example of features extraction, the inverse computation of logarithms 10^(.) 401 and inverse Fourier transform (iFFT) 402 are applied on the output of model enhancement stage 212. Enhanced features are obtained and output by the plurality of computations in the model enhancement stage 212 to post-processing 400. The enhanced features are computed as close to non-whisper speech comparing the input of whispered speech after being processed in pre-processing 211 and enhancement 212. The iFFT function 402 may allow to control size of the transformation. The reconstructed target signal may be resynthesized at a time through the iFFT while adjusting the phase between sequential glottal pulses. At pre-processing stage, the plurality of adjacent data windows are partially overlapped by approximately 50%, at post-processing stage, an inverse computation of overlap add 403 is to be carried out. FIG. 5 depicts a block diagram for a DNN architecture 500 according to an embodiment of the present disclosure.

Embodiment illustrated by FIG. 5 may be applied as an example for DNN model training stage 222.

As an example, DNN architecture 500 may comprise one or more neurons. Neurons are connected in hierarchical networks, with the outputs of some neurons being the inputs to others. The network may be represented as connected layers of nodes. The one or more neurons may be grouped together to form a plurality of layers. In FIG. 5, circles are used to denote neurons input to the network.

The example neural network 500 includes an input layer 510, layers 520, 530, 540 may be called middle layers or hidden layers, and layer 550 is an output layer. Values of the hidden layers 520, 530, 540 may be not observed in the training set. Each layer may have one or more neurons or nodes. Numbers of neurons can be different in each layer. Each neuron in each layer may be mapped with each neuron respectively in a neighboring layer, i.e. the output of the neuron may be provided as input to each neuron in the neighboring layer. For example, an input neuron in layer 520 maps into an output neuron in layer 510 as illustratively shown in FIG. 5. The input-output mapping may be defined by logistic regression.

Each neuron may receive a feature vector corresponding to a single window. Each neuron may take one or more weighted inputs, apply an activation function to the summation of the inputs, and in doing so generate an output. The weights may be multiplied by the inputs and then summed up in the node. The neuron can be a computational unit. Bias units may also be used in the computing process. The neural network has parameters for example W and b. Parameter W, for example W1, W2, W3, W4 are used as example to denote the parameter W or weight associated with the connection between neuron units in each layer. Parameter b may denote Bias, which is associated with each neuron unit. The bias element is included to enhance the flexibility of the network. The weights normally are fixed values output by the neural network or by outside input. The weights may be variables that can be changed during the learning process, and, along with the input, determine the output of the node.

The neural network 500 may be a feed forward neural network with the plurality of layers of non-linearities. These non-linear regression functions work together as well with the iFFT layer to map the whisper speech to output a non-whispered speech. The network architecture 500 may be trainable via a standard back propagation algorithm such as the iFFT layer, can be written in a set of matrix operations with fixed weight matrices. After training a neuron on the data, inferred states of the neuron units can be used as data for training another neuron. This can be repeated as many times as desired to produce many layers of non-linear feature detectors that represent progressively more complex statistical structure in the data. Each layer produces a higher level feature representation and produces a feature representation closer to a normal speech version of the original input speech than the original input speech itself. The neuron training process may be carried out by the loss function which is used to adjust the weights and biases of the neurons until the loss reaches a desired level.

A process of obtaining DNN trained model may be briefly described as the follows. First an example model is obtained from windows of acoustic coefficients. Then the states of the hidden units are used as data for training. This is repeated to create as many hidden layers as desired. Then the stack is converted to a single generative model, a DNN trained model. Learning occurs by repeatedly activating certain neural connections over others, and this reinforces those connections. Given a specified input, a desired outcome can be produced. The desired outcome may be called a feedback, the neural connections can strengthen the outcome strengthened.

Figure 6:
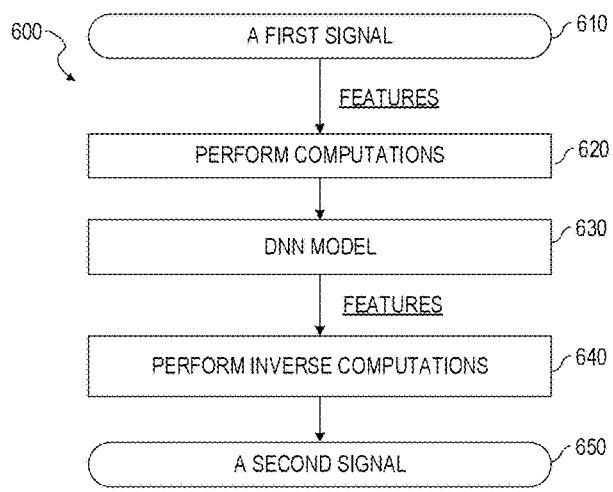
FIG. 6 shows a flowchart of a method of processing whispered speech according to an embodiment of the disclosure.

FIG. 6 shows a flowchart of a method of processing whispered speech according to an embodiment of the disclosure.

A method is provided for converting a whispered speech to a normal speech in FIG. 6. The method illustrated in FIG. 6 may be applied with embodiments of FIG. 1-5. A first signal 610 is received including first whispered speech; a first plurality of computations are performed 620 on the first signal to extract a whispered speech features; the whispered speech features are provided as input to a trained deep neural network (DNN) model 630 to obtain output of the DNN model comprising a non-whispered speech features; and an inverse of the first plurality of computations are performed 640 on the non-whispered speech features to produce a second signal 650 corresponding to a non-whispered version of the first whispered speech.

Figure 7:
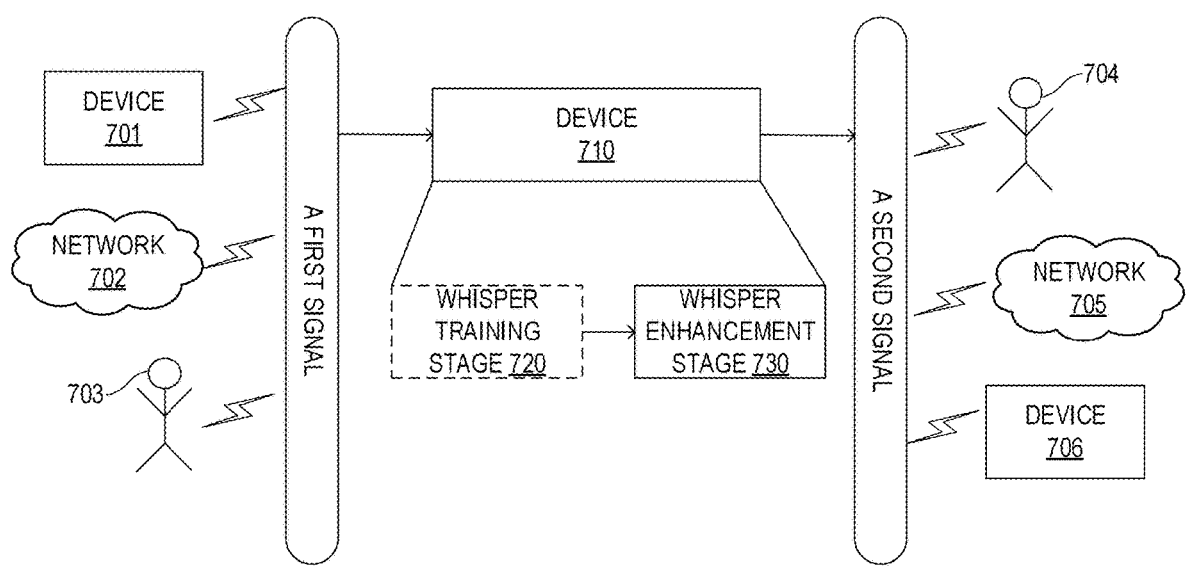
FIG. 7 is a schematic diagram of a network device according to an embodiment of the disclosure.

FIG. 7 is a schematic diagram of a network device according to an embodiment of the disclosure that can be used to perform the operations of the methods and techniques described herein.

An embodiment is provided for converting a whispered speech to a normal speech in FIG. 7. Input of a first signal may be received from various resources e.g. a network 701, device 702, people 703. The first signal includes first whispered speech. A device 710 is configured to convert the whispered speech to a non-whispered speech is provided. The device includes a function module to perform a whisper training stage 720, and a function module to perform a whisper enhancement stage 730.

The whisper training stage 720 may apply all functions and process of Whisper training stage 220 as described above. The DNN model may be obtained through performing DNN architecture 500, the whisper training stage 720, or from a resource like device 701, network 702 etc. Thus the whisper training stage 720 can be optional for the device 710.

The whisper enhancement stage 730 may apply all functions and process of whisper enhancement stage 210 as described above.

The device is configured to receive the first signal; a first plurality of computations are performed on the first signal to extract a whispered speech features; the whispered speech features are provided as input to a trained deep neural network (DNN) model to obtain output of the DNN model comprising a non-whispered speech features; and an inverse of the first plurality of computations are performed on the non-whispered speech features to produce a second signal corresponding to a non-whispered version of the first whispered speech. The second signal may be output to various resources e.g. people 704, a network 705, device 706.

Whispered speech can be effectively used in various scenarios. For example, whisper can be used for private and confidential communication over phone. Whisper speech may be used to reduce the distance of speech perception and therefore the distance of its intelligibility. It can also be used in meeting rooms, elevators, and other public places to avoid disturbing other people. In other scenario, whisper is being used for communication of patients with laryngeal disease.

Figure 8:
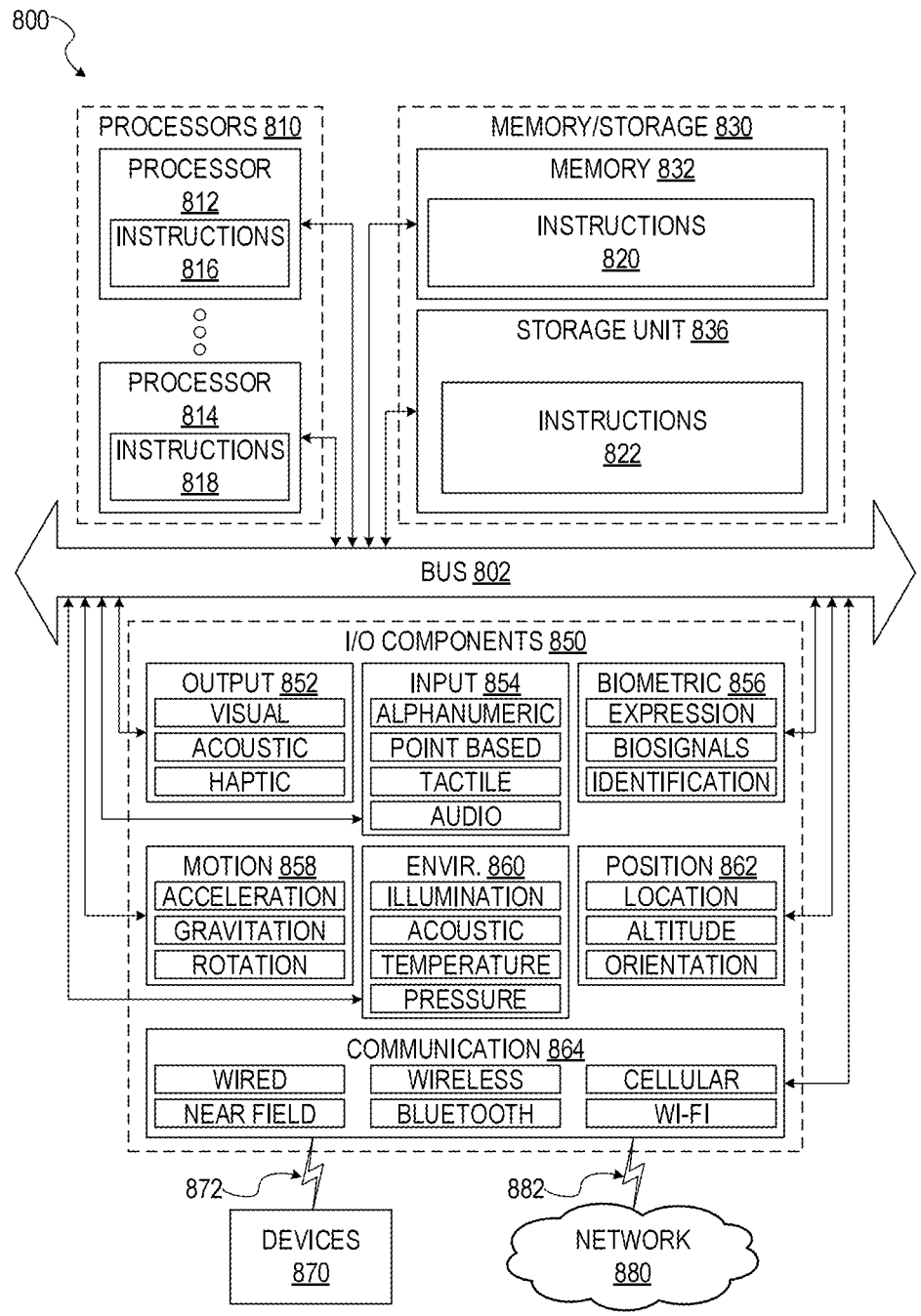
FIG. 8 is an example machine architecture and machine-readable medium as according to an embodiment of the disclosure.

FIG. 8 is an example machine architecture and machine-readable medium as according to an embodiment of the disclosure that can be used to perform the operations of the methods and techniques described herein.

A block diagram illustrating components of a machine 800 is provided in FIG. 8, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816-822 (e.g., software, a program, an application, an applet, an app, or other executable code) for causing the machine 800 to perform any one or more of the methodologies discussed herein may be executed. For example the instructions may cause the machine to execute the flow diagrams of FIGS. 1-7. Additionally or alternatively, the instructions may implement the whisper enhancement stage 210 and whisper training stage 220 of FIG. 2. The instructions transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but is not limited to, a server computer, a client computer, a personal computer (PC), or any machine capable of executing the instructions 816-822, sequentially or otherwise, that specify actions to be taken by machine 800. Further, while only a single machine 800 is illustrated, the term "machine" shall also be taken to include a collection of machines 800 that individually or jointly execute the instructions 816-822 to perform any one or more of the methodologies discussed herein.

The machine 800 may include processors 810, memory 830, and I/O components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, processor 812 and processor 814 that may execute instructions 816 and instructions 818, respectively. The term "processor" is intended to include multi-core processors that comprise two or more independent processors (sometimes referred to as "cores") that may execute instructions contemporaneously. Although FIG. 8 shows multiple processors, the machine 800 may include a single processor with a single core, a single processor with multiple cores, multiple processors with a single core, multiple processors with multiples cores, or any combination thereof.

The memory/storage 830 may include a memory 832, such as a main memory, or other memory storage, and a storage unit 836, each accessible to the processors 810, such as via the bus 802. The storage unit 836 and memory 832 store the instructions 822 and the instructions 820, respectively, embodying any one or more of the methodologies or functions described herein. Instructions, e.g., instructions 816-822, may also reside, completely or partially, within the memory 832, within the storage unit 836, within at least one of the processors 810 (e.g., within the processor's cache memory), or any suitable combination thereof, during execution thereof by the machine 800. Accordingly, the memory 832, the storage unit 836, and the memory of processors 810 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., instructions 816-822) for execution by a machine (e.g., machine 800), such that the instructions, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location or force of touches or touch gestures, or other tactile input components), audio input components (e.g., a microphone), and the like.

In further example embodiments, the I/O components 850 may include biometric components 856, motion components 858, environmental components 860, or position components 862 among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via coupling 882 and coupling 872, respectively. For example, the communication components 864 may include a network interface component or other suitable device to interface with the network 880. In further examples, communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a USB).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, Uniform Code Council Reduced Space Symbology codes (e.g., UCC RSS-2D bar code), and other optical codes), or acoustic detection components (e.g., microphones to identify tagged audio signals). In addition, a variety of information may be derived via the communication components 864, such as, location via Internet Protocol (IP) geo-location, location via Wi-Fi® signal triangulation, location via detecting a NFC beacon signal that may indicate a particular location, and so forth.

In various example embodiments, one or more portions of the network 880 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or other type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 816-822 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816-822 may be transmitted or received using a transmission medium via the coupling 872 (e.g., a peer-to-peer coupling) to devices 870. The term "transmission medium" shall be taken to include any intangible medium that is capable of storing, encoding, or carrying instructions for execution by the machine 800, and includes digital or analog communications signals or other intangible medium to facilitate communication of such software.

Optionally, device 710 may be performed in the GPU or CPU.

Optionally, a neuronal structure of DNN model training process 500 may be implemented in a software.

It should be understood that software can be installed in and sold with the network device 710. Alternatively the software can be obtained and loaded into the network device 710, including obtaining the software through physical medium or distribution system, including, for example, from a server owned by the software creator or from a server not owned but used by the software creator. The software can be stored on a server for distribution over the Internet, for example.

An example embodiment includes a method of processing whispered speech which may be applied individually or combined with combination of all or any one of the embodiments disclosed above. The method includes receiving a first audio signal comprising first whispered speech; performing a first plurality of computations on the first signal to extract a plurality of whispered speech features; providing the whispered speech features as input to a trained deep neural network (DNN) model to obtain output of the DNN model comprising a plurality of non-whispered speech features; and performing an inverse of the first plurality of computations on the non-whispered speech features to produce a second audio signal corresponding to a non-whispered version of the first whispered speech.

Optionally, in the preceding embodiment, the method includes wherein the whispered speech and non-whispered speech features respectively comprises a plurality of frequencies.

Optionally, in any of the preceding embodiments, the method includes wherein performing the first plurality of computations on the first audio signal to extract the whispered speech features comprises: dividing the first audio signal into a plurality of partially overlapping data windows; and performing the first plurality of computations on the data windows.

Optionally, in any of the preceding embodiments, the method includes wherein adjacent windows overlap by approximately 50%.

Optionally, in any of the preceding embodiments, the method includes wherein performing the first plurality of computations on the first audio signal to extract the whispered speech features further comprises: performing a Fast Fourier Transform (FFT) of the data windows to produce a discrete Fourier Transform (DFT); and calculating the log 10 of a magnitude of the DFT to produce the whispered speech features.

Optionally, in any of the preceding embodiments, the method includes wherein the DNN model is a feed-forward model and wherein the model comprises an input layer, an output layer and a plurality of hidden layers between the input and output layers.

Optionally, in any of the preceding embodiments, the method includes wherein the whispered speech features are provided to the input layer, wherein the method comprises applying forward propagation to the DNN model to obtain the non-whispered speech features from the output layer.

Optionally, in any of the preceding embodiments, the method further includes: obtaining a plurality of different training pairs, wherein each training pair comprises whispered speech features of a respective audio signal comprising whispered speech and non-whispered speech features of a respective audio signal comprising a non-whispered version of the whispered speech; and for each of the training pairs: supplying the whispered speech features of the pair as input to the DNN model and comparing the output of the DNN to the non-whispered speech features of the pair using a loss function that produces an output; and applying back-propagation to the DNN model based on the output of the loss function to train the DNN model.

Optionally, in any of the preceding embodiments, the method includes wherein the loss function is:

$$\sum_{n=1}^{N} \left\| \hat{Y}_n(W, b) - Y_n \right\|_2^2,$$

wherein N indicates total number of the plurality of neurons in the DNN model, n indicates count of the calculation of the loss function, W indicates combination of the plurality of weights, b indicates the plurality of biases which are constant number, Y is the non-whispered speech features of the training pair, $\hat{Y}$ is the whispered speech features of the training pair. The output by the loss function 223 as also disclosed in FIG. 2 may include: receiving a fourth signal comprising fourth normal speech; a pre-processing 231 may be configured to perform a fourth plurality of computations on the fourth signal to extract a fourth set of features; the fourth set of features may be provided as a calculation input to the loss function 223. A loss function 223 is applied to compare the third set of features to the fourth set of features. The comparing process may include: calculating the loss function between the third and fourth set of features; applying a plurality of weights and biases repeatedly in the calculating process until a calculation result of the loss function reaches a threshold. Weights and biases may be vectors for the neurons.

An embodiment includes a device of processing whispered speech which may be applied individually or combined with combination of all or any one of the embodiments disclosed above. The device includes a memory storing instructions; and a processor coupled to the memory, wherein when the processor executes the instructions, the processor performs operations: receiving a first audio signal comprising first whispered speech; performing a first plurality of computations on the first signal to extract a plurality of whispered speech features; providing the whispered speech features as input to a trained deep neural network (DNN) model to obtain output of the DNN model comprising a plurality of non-whispered speech features; and performing an inverse of the first plurality of computations on the non-whispered speech features to produce a second audio signal corresponding to a non-whispered version of the first whispered speech.

Optionally, in the preceding embodiment, the device includes wherein the whispered speech and non-whispered speech features respectively comprises a plurality of frequencies.

Optionally, in any of the preceding embodiments, the device includes wherein performing the first plurality of computations on the first audio signal to extract the whispered speech features comprises: dividing the first audio signal into a plurality of partially overlapping data windows; and performing the first plurality of computations on the data windows.

Optionally, in any of the preceding embodiments, the device includes wherein adjacent windows overlap by approximately 50%.

Optionally, in any of the preceding embodiments, the device includes wherein performing the first plurality of computations on the first audio signal to extract the whispered speech features further comprises: performing a Fast Fourier Transform (FFT) of the data windows to produce a discrete Fourier Transform (DFT); and calculating the log 10 of a magnitude of the DFT to produce the whispered speech features.

Optionally, in any of the preceding embodiments, the device includes wherein the DNN model is a feed-forward model and wherein the model comprises an input layer, an output layer and a plurality of hidden layers between the input and output layers.

Optionally, in any of the preceding embodiments, the device includes wherein the whispered speech features are provided to the input layer, wherein the method comprises applying forward propagation to the DNN model to obtain the non-whispered features from the output layer.

Optionally, in any of the preceding embodiments, the processor performs operations further including: obtaining a plurality of different training pairs, wherein each training pair comprises whispered speech features of a respective audio signal comprising whispered speech and non-whispered features of a respective audio signal comprising a non-whispered version of the whispered speech; and for each of the training pairs: supplying the whispered speech features of the pair as input to the DNN model and comparing the output of the DNN to the non-whispered features of the pair using a loss function that produces an output; and applying back-propagation to the DNN model based on the output of the loss function to train the DNN model.

Optionally, in any of the preceding embodiments, the device includes wherein the loss function is:

$$\sum_{n=1}^{N} \left\| \hat{Y}_n(W, b) - Y_n \right\|_2^2,$$

wherein N indicates total number of the plurality of neurons in the DNN model, n indicates count of the calculation of the loss function, W indicates combination of the plurality of weights, b indicates the plurality of biases which are constant number, Y is the non-whispered speech features of the training pair, $\hat{Y}$ is the whispered speech features of the training pair.

The use of the term "about" means a range including ±10% of the subsequent number, unless otherwise stated. While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method of processing whispered speech comprising:
receiving a first audio signal comprising first whispered speech;
performing a first plurality of computations on the first audio signal to extract a plurality of first features;
providing the first features as input to a trained deep neural network (DNN) model to obtain output of the DNN model comprising a plurality of second features, wherein the DNN was trained by:
obtaining a plurality of different training pairs, wherein each training pair comprises first features of a respective audio signal comprising whispered speech and second features of a respective audio signal comprising a non-whispered version of the whispered speech; and
for each of the training pairs:
supplying the first features of the pair as input to the DNN model and comparing the output of the DNN to the second features of the pair using a loss function that produces an output; and
applying back-propagation to the DNN model based on the output of the loss function to train the DNN model, wherein the loss function is:

$$\sum_{n=1}^{N} \left\| \hat{Y}_n(W, b) - Y_n \right\|_2^2,$$

wherein
N indicates total number of a plurality of neurons in the DNN model,
n indicates count of calculation of the loss function,
W indicates a combination of a plurality of weights,
b indicates a plurality of biases which are constant number, Y indicates the second features of the training pair,
Ŷ indicates the first features of the training pair; and
performing an inverse of the first plurality of computations on the plurality of second features to produce a second audio signal corresponding to a non-whispered version of the first whispered speech.

2. The method of claim 1, wherein the plurality of first features and the plurality of second features respectively comprise a plurality of frequencies.

3. The method of claim 1 wherein performing the first plurality of computations on the first audio signal to extract the first features comprises:
dividing the first audio signal into a plurality of partially overlapping data windows; and
performing the first plurality of computations on the data windows.

4. The method of claim 3 wherein adjacent windows overlap by approximately 50%.

5. The method of claim 3 wherein performing the first plurality of computations on the first audio signal to extract the first features further comprises:
performing a Fast Fourier Transform (FFT) of the data windows to produce a discrete Fourier Transform (DFT); and calculating $\log_{10}$ of a magnitude of the DFT to produce the first features.

6. The method of claim 1, wherein the DNN model is a feed-forward model and wherein the model comprises an input layer, an output layer and a plurality of hidden layers between the input and output layers.

7. The method of claim 6 wherein the first features are provided to the input layer, wherein the method comprises applying forward propagation to the DNN model to obtain the second features from the output layer.

8. A device of processing whispered speech comprising:
a memory storing instructions; and
a processor coupled to the memory, wherein when the processor executes the instructions, the processor performs operations comprising:
receiving a first audio signal comprising first whispered speech;
performing a first plurality of computations on the first audio signal to extract a plurality of first features;
providing the first features as input to a trained deep neural network (DNN) model to obtain output of the DNN model comprising a plurality of second features wherein the DNN was trained by:
obtaining a plurality of different training pairs, wherein each training pair comprises first features of a respective audio signal comprising whispered speech and second features of a respective audio signal comprising a non-whispered version of the whispered speech; and
for each of the training pairs:
supplying the first features of the pair as input to the DNN model and comparing the output of the DNN to the second features of the pair using a loss function that produces an output; and
applying back-propagation to the DNN model based on the output of the loss function to train the DNN model, wherein the loss function is:

$$\sum_{n=1}^{N} \left\| \hat{Y}_n(W, b) - Y_n \right\|_2^2,$$

wherein
N indicates total number of a plurality of neurons in the DNN model,
n indicates count of calculation of the loss function,
W indicates a combination of a plurality of weights,
b indicates a plurality of biases which are constant number,
Y indicates the second features of the training pair,
Ŷ indicates the first features of the training pair; and
performing an inverse of the first plurality of computations on the second features to produce a second audio signal corresponding to a non-whispered version of the first whispered speech.

9. The device of claim 8, wherein the plurality of first features and the plurality of second features respectively comprise a plurality of frequencies.

10. The device of claim 8, wherein performing the first plurality of computations on the first audio signal to extract the first features comprises:
dividing the first audio signal into a plurality of partially overlapping data windows; and
performing the first plurality of computations on the data windows.

11. The device of claim 10, wherein adjacent windows overlap by approximately 50%.

12. The device of claim 10, wherein performing the first plurality of computations on the first audio signal to extract the first features further comprises:
performing a Fast Fourier Transform (FFT) of the data windows to produce a discrete Fourier Transform (DFT); and
calculating $\log_{10}$ of a magnitude of the DFT to produce the first features.

13. The device of claim 8, wherein the DNN model is a feed-forward model and wherein the model comprises an input layer, an output layer and a plurality of hidden layers between the input and output layers.

14. The device of claim 13, wherein the first features are provided to the input layer, wherein the processor performs operations further comprising: applying forward propagation to the DNN model to obtain the second features from the output layer.

15. A non-transitory, computer-readable medium storing one or more instructions executable by a computer system to perform operations comprising:
receiving a first audio signal comprising first whispered speech;
performing a first plurality of computations on the first audio signal to extract a plurality of first features;
providing the first features as input to a trained deep neural network (DNN) model to obtain output of the DNN model comprising a plurality of second features, wherein the DNN was trained by:
obtaining a plurality of different training pairs, wherein each training pair comprises first features of a respective audio signal comprising whispered speech and second features of a respective audio signal comprising a non-whispered version of the whispered speech; and
for each of the training pairs:
supplying the first features of the pair as input to the DNN model and comparing the output of the DNN to the second features of the pair using a loss function that produces an output; and
applying back-propagation to the DNN model based on the output of the loss function to train the DNN model, wherein the loss function is:

$$\sum_{n=1}^{N}\|\hat{Y}_n(W, b) - Y_n\|_2^2,$$

wherein
N indicates total number of a plurality of neurons in the DNN model,
n indicates count of calculation of the loss function,
W indicates a combination of a plurality of weights,
b indicates a plurality of biases which are constant number,
Y indicates the second features of the training pair,
$\hat{Y}$ indicates the first features of the training pair; and
performing an inverse of the first plurality of computations on the second features to produce a second audio signal corresponding to a non-whispered version of the first whispered speech.

16. The non-transitory, computer-readable medium of claim 15, wherein the plurality of first features and the plurality of second features respectively comprise a plurality of frequencies.

17. The non-transitory, computer-readable medium of claim 15, wherein performing the first plurality of computations on the first audio signal to extract the first features comprises:
dividing the first audio signal into a plurality of partially overlapping data windows; and
performing the first plurality of computations on the data windows.

18. The non-transitory, computer-readable medium of claim 17, wherein adjacent windows overlap by approximately 50%.

19. The non-transitory, computer-readable medium of claim 17, wherein performing the first plurality of computations on the first audio signal to extract the first features further comprises:
performing a Fast Fourier Transform (FFT) of the data windows to produce a discrete Fourier Transform (DFT); and calculating $\log_{10}$ of a magnitude of the DFT to produce the first features.

20. The non-transitory, computer-readable medium of claim 15,
wherein the DNN model is a feed-forward model,
wherein the model comprises an input layer, an output layer and a plurality of hidden layers between the input and output layers,
wherein the first features are provided to the input layer, and
wherein the operations comprise applying forward propagation to the DNN model to obtain the second features from the output layer.

* * * * *